(12) United States Patent
Morgan et al.

(10) Patent No.: US 6,870,498 B1
(45) Date of Patent: Mar. 22, 2005

(54) GENERATION OF ELECTROMAGNETIC RADIATION

(75) Inventors: David Morgan, Filton (GB); Lee Miller, Filton (GB); David E T F Ashby, Oxon (GB); John G. Morgan, Oxon (GB)

(73) Assignee: MBDA UK Limited, Hertfordshire (GB)

( * ) Notice: Subject to any disclaimer, the term of this patent is extended or adjusted under 35 U.S.C. 154(b) by 1826 days.

(21) Appl. No.: 07/418,938

(22) Filed: Oct. 6, 1989

Related U.S. Application Data

(63) Continuation of application No. 07/275,644, filed on Nov. 23, 1988, which is a continuation of application No. 07/058,003, filed on May 28, 1987, now abandoned.

(51) Int. Cl.$^7$ .................. H04K 3/00; H01Q 15/02; G21B 1/00; G21J 1/00
(52) U.S. Cl. .................. 342/14; 343/909; 376/105; 376/127
(58) Field of Search .................. 342/1, 13, 14; 343/909; 376/127, 145, 156, 105; 380/59; 361/231, 233

(56) References Cited

U.S. PATENT DOCUMENTS

| | | | | |
|---|---|---|---|---|
| 3,715,595 A | * | 2/1973 | Josephson | 376/145 |
| 3,959,796 A | * | 5/1976 | Merkel et al. | 343/909 |
| 4,126,806 A | * | 11/1978 | Kapetanakos et al. | 376/156 |
| 4,387,467 A | * | 6/1983 | Kirby | 342/1 |
| 4,393,509 A | * | 7/1983 | Merkel et al. | 376/156 |
| 4,421,713 A | * | 12/1983 | Manheimer et al. | 376/127 |
| 4,446,096 A | * | 5/1984 | Auchterlonie | 376/145 |
| 4,657,722 A | * | 4/1987 | Bennett | 376/156 |
| 4,686,605 A | * | 8/1987 | Eastlund | 380/59 |
| 4,712,155 A | * | 12/1987 | Eastlund et al. | 380/59 |

* cited by examiner

*Primary Examiner*—Bernarr E. Gregory
*Assistant Examiner*—Brian Andrea
(74) *Attorney, Agent, or Firm*—Nixon & Vanderhye P.C.

(57) ABSTRACT

A system for generating electromagnetic radiation comprising a flux generator for generating a high intensity current and conversion means in the form of a reflex triode or a plasma focus device for converting said current into a high energy radiation beam.

9 Claims, 6 Drawing Sheets

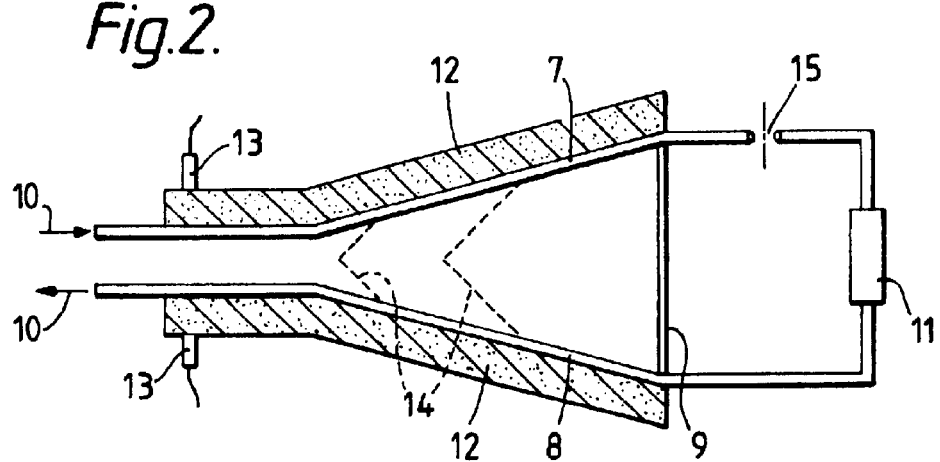
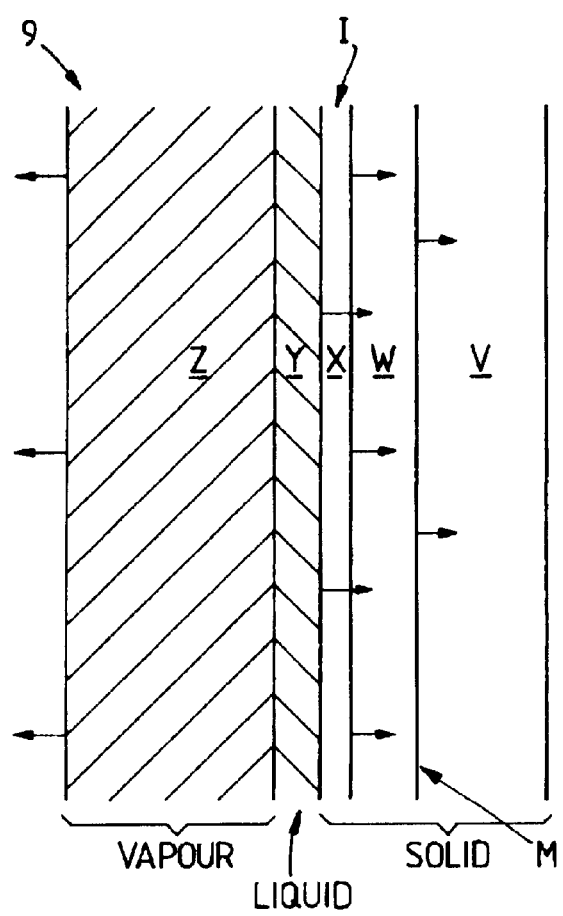

GENERATION OF ELECTROMAGNETIC RADIATION

This is a continuation of application Ser. No. 07/058,003, filed May 28, 1987, which was abandoned upon the filing hereof.

This invention relates to the generation of electromagnetic radiation.

Intense pulses of electromagnetic radiation are generated by the explosion of nuclear devices. These pulses cause damage or disturbance to electronic equipment in the vicinity of the explosion and the effects of disturbance, for example software damage, may be experienced over a much wider area. It has been proposed that such intense pulses of electromagnetic radiation be generated by non-nuclear systems and be used against electronic devices such as communications systems or the guidance systems of missiles, aircraft or satellites. Our co-pending Patent Applications Nos. 8603115 and 8611038, the latter entitled "Generation of Electromagnetic Radiation" and of even date herewith, disclose an electromagnetic pulse generating system which can be used in the above-mentioned systems. The system so described generates an electric field and an associated magnetic field around the target, the wavelength of the incident radiation being comparable with the size of the target hence a target of 4 m length is best "attacked" using a frequency of 75 MHz. The principal feature of this form of 'attack' mechanism is the coupling between the electric field and the target structure which gives rise to large currents which flow within the target structure. These currents form a complex intercoupled network which in turn produces electric and magnetic fields giving rise to either failure or disturbance of susceptible electronic devices.

However, in order to attack electronic components or devices directly, the incident radiation should have a wavelength comparable to the size of the components to provide the appropriate coupling.

According to one aspect of the present invention, there is provided an electromagnetic radiation generating system comprising:

means for generating a high intensity current;
conversion means for converting said current into a high energy radiation beam; and
means for radiating said high energy beam.

According to another aspect of this invention, there is provided an electromagnetic radiation generating system comprising:

generator means for generating a high intensity electrtical energy transient,
conversion means for utilising said transient to generate a high energy beam of electromagnetic radiation containing relatively high frequencies, and
means for radiating said high energy beam.

In one arrangement said transient is at a power level in excess of one Gwatt and said beam contains frequencies in excess of 1 GHz.

In one embodiment of the invention, said conversion means may be a microwave converter, for example magnetically insulated line oscillator (crossed field device), or a reflex triode. In a further embodiment, said conversion means is a plasma focus device. Advantageously, said plasma focus device produces relativistic electrons which lead to generation of said beam. In an embodiment to be described, the plasma focus device comprises an anode and a cathode configured to define a cavity therebetween and in which the anode is provided with an aperture for allowing passage of an electron beam generated in the device.

Advantageously, said generator means comprises a flux compressor.

The system may further include transformer means connected to said conversion means on its secondary side and to said generating means on its primary side.

Preferably said radiation transmitting system comprises an antenna system which includes wave guide means connecting it to said conversion means. Where said conversion means comprises a plasma focus device it is preferred to inject said electrons directly into said waveguide means.

Alternatively, said radiation distribution system may comprise a transmissive window through which said beam passes.

For a better understanding of the invention, reference will now be made, by way of example, to the accompanying drawings in which:

FIG. 2 is a schematic sectional side elevation of a pulse generating arrangement;

FIG. 3 is a schematic representation of a component of FIG. 2 during operation;

In order to provide coupling between an electric field and the components within a target, the wavelength of radiation needs to be of a comparable size to the components, that is, of the order of millimetres and centimetres. It is therefore necessary to use radiation having a frequency range typically of 3 to 30 GHz i.e. microwaves. To achieve the failure or damage of the components, the electric field has to propagate within the component enclosures rather than coupling with the target structure as previously mentioned. The field is likely to penetrate through cracks and joints in the target structure, but the primary entry mode will be direct coupling to the sensors, for example, the electric field will enter the target via its antenna.

The systems as described in our co-sending application referred to above can be considered as a point source radiator, whereas the system to be described herein directs beams of radiation towards a target.

Figure 1:
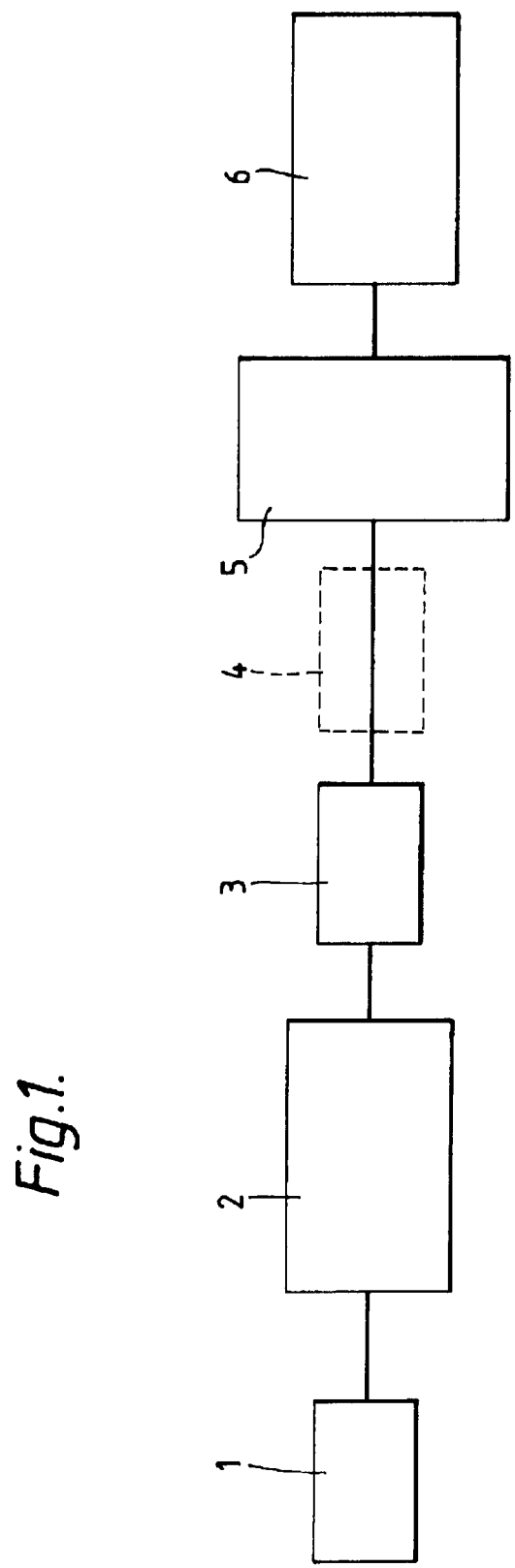
FIG. 1 is a schematic block diagram of an electromagnetic radiation generating system.

Referring to FIG. 1, an electromagnetic radiation generating system comprises an initial energy source 1 which provides a seed current to a main power generator 2. The power generator 2 is a flux compressor (shown in more detail in FIG. 2) which incorporates a magnetic shock wave switch or magneto-baric fuse 3. The output from the generator 2 is fed to a transformer 4 which transforms the output current from the generator 2 to a value which is compatible with a microwave converter 5. The converter 5 converts the current into a beam of microwave radiation which is then transmitted by an antenna system 6.

The initial energy source 1 may be provided by one of several sources, for example a chemical explosive, a capacitor bank system or a battery. However, the system most used due to its flexibility and high transfer efficiency is the capacitor bank system.

As mentioned previously, the main power generator 2 is a flux compressor whose operation will be described with reference to FIG. 2. The flux compressor can be considered as a variable inductance. The compressor 2 consists of two opposed generally flat, divergent liner members 7 and 8 which are joined together at their base regions (that is to say their divergent ends) by a thin conductor member 9. The members 7 and 8 are made of copper or other electrically conducting material. Member 9 may also be made of copper but is preferably made of a lower melting point material such as aluminium.

A seed current 10 supplied by the source 1 flows around the circuit formed by the two liner members 7, 8 and the conductive member 9. The members 7, 8 are also connected to a transformer 11, via a dielectric switch 15 so that the transformer 11 is in parallel with the member 9. High explosives 12 are attached on the outside of the liner members 7 and 8 arranged for detonation by detonators 13. More detonators may be positioned along the length of explosive 12 and detonated sequentially if required.

The seed current 10 flowing through members 7, 8 and 9 is of the order of 10–100 kA and generates a magnetic field. On detonation of the explosives 12, the liner members 7, 8 are forced to collapse inwardly (as indicated by the dotted lines 14 in FIG. 2 showing the liner at two stages during the compression sequence). The force of the explosion reduces the volume of the flux compressor and hence reduces the inductance of the flux compressor. This reduction in inductance causes an increase in the magnetic flux density in the circuit now formed by the members 7, 8 and 9 and hence causes an increase in the current flowing in the circuit.

The energy gain, G, of a flux compressor is defined by $$\frac{Bi^2}{2\mu} A_i \cdot w \cdot G = \frac{Bf^2}{2\mu} A_f \cdot w$$

where $\frac{B^2}{2\mu}$ = energy stored in a magentic $B$ field.

$B_i$ = initial magnetic flux inside the compressor, $B_f$ = final magnetic flux inside the compressor, $A_i$ = initial cross sectional area of compressor internal volume, $A_f$ = final cross sectional area of compressor internal volume, $\mu$ = *permeability of* compressor internal volume, and $w$ = width of compressor.

As $\phi$ = magnetic flux density = $B \times A$ $$G = \left(\frac{\phi_f}{\phi_i}\right)^2 \times \frac{A_i}{A_f}$$

Where $$\frac{\phi_f}{\phi_i}$$

can be termed the flux loss coefficient.

There is a high physical pressure within the operating flux compressor which includes a component associated with the magnetic field, the 'magnetic pressure' which is defined by:

$$P_r = \frac{B^2}{2\mu}$$

Where B=the magnetic flux density in Tesla (T)

and $\mu$=the permeability of the medium=$4_\Pi \times 10^{-7}$H/m for free space To give some idea of the magnitude of this pressure component it is not unreasonable to achieve a maximum flux density of 100T within a flux compressor. If B=100T, P=40,000 bar approximately. If this magnetic flux can be generated faster than the speed of propagation of the flux through the medium which is not unreasonable for a flux compression device, then a magnetic shock wave is created.

The compression thus sets up a magnetic shock wave which expands radially through the volume defined by the liner members 7, 8 and the conductor 9 and induces a current in the conductors which is orthogonal to the magnetic flux and in this case is parallel to the magnetic wave front. As the wave front expands radially and permeates into the conductors surrounding the internal volume i.e. the liner members 7, 8 and conductor 9, a very large current is induced in the vicinity of the magnetic wave front. The volume that contains this current ie the closed circuit formed by the liner members 7, 8 and the conductor 9, is very small resulting in an extremely large current density, J, the power dissipated in this volume being given by:

ti P=J$^2$p where P is the power dissipated per unit volume

J is the current density per unit area and p is the resisitivity of the conductor.

The term 'skin depth' will be used for the thickness of the current which can be considered as an expanding sheet. For example, for a compressor generating 100T, in copper of resistivity $10^{-8}$ Ωm the current density is approximately $10^{12}$Am$^{-2}$ assuming a skin depth of 0.1 mm so that the power dissipated is $10^{16}$Wm$^{-3}$. This amount of power will generate sufficient heat to first melt and then vaporise the conductor 9. Due to the gas expansion vapour and particles of the conductor 9 flow back into the centre of the compressor.

Referring to FIG. 3, the conductor 9 is shown diagramatically in cross section and the labelled regions are as follows (from right to left);

V—a region of uncompressed solid metal in front of the advancing magentic shock wave M;

W—a region of solid metal which has been compressed by the advancing magnetic shock wave M;

X—a region of hot metal containing the current sheet I (current density per unit area is of the order of 1 TA/m$^2$);

Y—a region of liquid metal which has been melted on passage of the current sheet I; Z—a region of vaporised metal which is expanding rapidly due to gas pressure.

The current sheet moves through the material of the member 9 just behind the magnetic shock wave, progressively vaporising the member 9 as indicated schematically in FIG. 3. Whilst this is taking place, the current is still flowing round the members 7, 8 and 9, until the member 9, is totally vaporised. The current flow continues to increase until the current sheet reaches the outer boundary 8 of the member 9. From this point in time, the current flow will be reduced to zero in the time it takes the current sheet to travel its own thickness Ie the skin depth. Therefore if the skin depth is 0.1 mm and the current sheet is travelling at a velocity between 300 and 900 ms$^{-1}$, the shut-off time for the current is between 100 and 330 ns, and the section of conductor 9 which burns out first acts as a very fast acting opening switch for a high current. Thus, the conductor 9 can be described as the magnetic shock wave switch 3 of FIG. 1. The switch 3 carries the main current pulse, until, around the time of maximum current, it bursts thus impeding the current flow and causing a large voltage to appear across the dielectric switch 15 which breaks down and allows a pulse of current to flow to the transformer 11.

It should be understood that the conductor 9 may be contoured according to requirements and may be of varying thickness and/or may be arcuate Furthermore, the conductive liners, 7, 8 may be differently shaped from those described according to requirements. In addition, different types of flux compressors rather than the plate type flux compressor described may be used.

Figure 4:
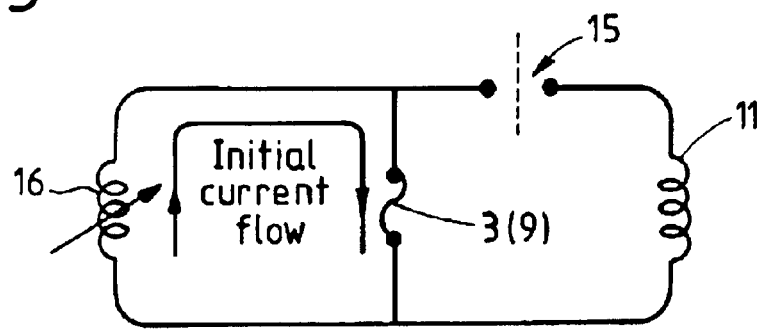
FIG. 4 is a circuit diagram corresponding to the arrangement of FIG. 2.
Figure 5A:
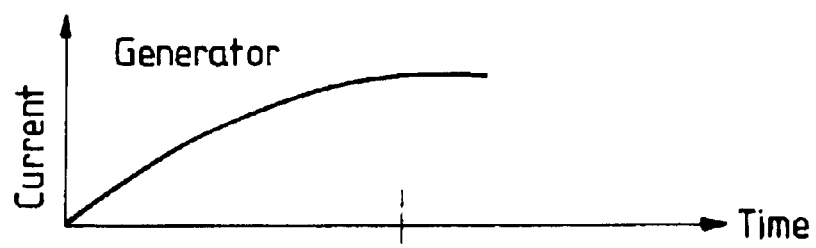
FIGS. 5a and 5b are graphs of current against time for the FIG. 4 circuit.
Figure 5B:
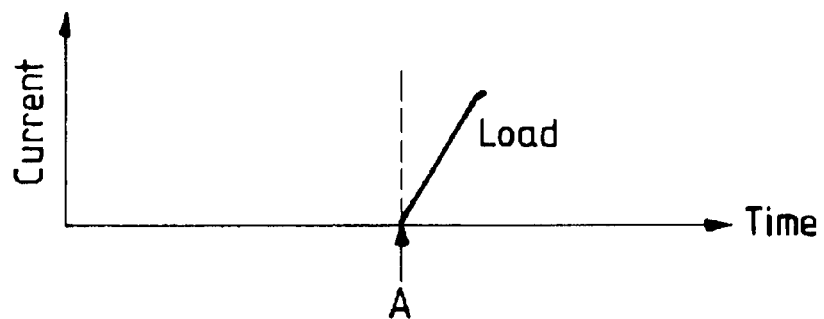

FIG. 4 is an equivalent circuit diagram to the arrangement of FIG. 2. Like reference numerals relate to like components in these figures, the compressor 2 is shown as a variable inductor 16, and the fuse 3 is indicated as are the transformer 11 and dielectric switch 15. FIGS. 5a and 5b are graphs of current against time for the compressor—the point at which the switch 3 opens being indicated by 'A'.

FIG. 5a illustrates the relatively slowly rising current produced by the flux compressor 2 and FIG. 5b illustrates how this is converted into a pulse supplied to the load having a much shorter rise time using the magneto-baric fuse 3.

The transformer 4 is required to transform the output voltage from the generator 2, typically around 100 kV, to a higher voltage necessary for the operation of the microwave converter 5, typically around 300 kV. The function of the microwave converter 5 is to convert electrical energy in the form of a high current transient having a power level of the order 10 GW, produced by the generator 2 into microwave energy which can then be transmitted by the antenna 6 via a waveguide (not shown). One device which can be used as the microwave converter is a reflex triode 18 whose operation will now be described with reference to FIG. 6.

Figure 6:
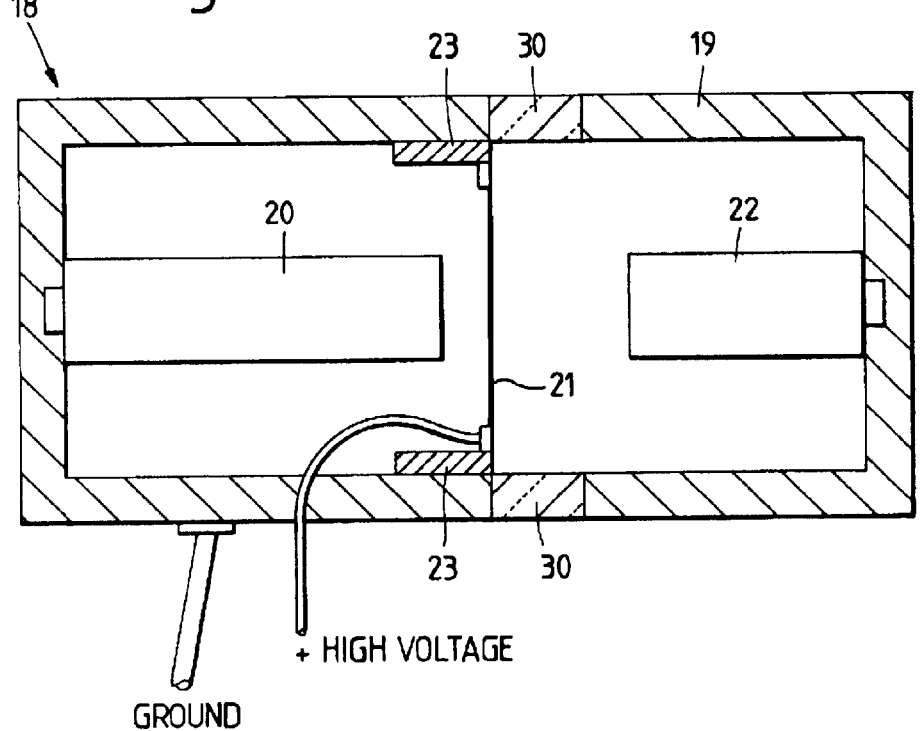
FIG. 6 is a schematic diagram of a reflex triode which may be used in the arrangement FIG. 1 to convert the high intensity current into a radiation beam.

FIG. 6 illustrates the geometry of the triode 18. The triode comprises a casing 19 in which is mounted a cathode 20, an anode 21 and a plate (a second cathode) 22. The anode is in the form of a piece of foil (eg aluminised Mylar). The cathode and plate are connected to the casing which is at ground potential. The anode is insulated from the casing 19 by an insulating member 23. The anode is connected to the electrical supply via an insulated conduit which passes through the casing. The casing is connected to the supply ground potential.

The essential feature of the reflex triode is that an electron emitted from the cathode 20 is accelerated towards and subsequently traverses the anode 21 losing kinetic energy in the process. The electron is then reflected by the plate 22 and is attracted back towards the anode 21. The electron continues to 'reflex' through the anode until its kinetic energy becomes too low to penetrate the foil. Macroscopically the relativistic eletron oscillations about the anode are accompanied by intense radiative emissions in the frequency range 2–20 GHz at peak power levels of the order of 1GW which can then be transmitted by a window 30. This transmitted radiation, as mentioned previously, is directed to an antenna system via a waveguide for direction to a target. The output obtained is typically bursts of microwave energy of a few microseconds duration.

Figure 7:
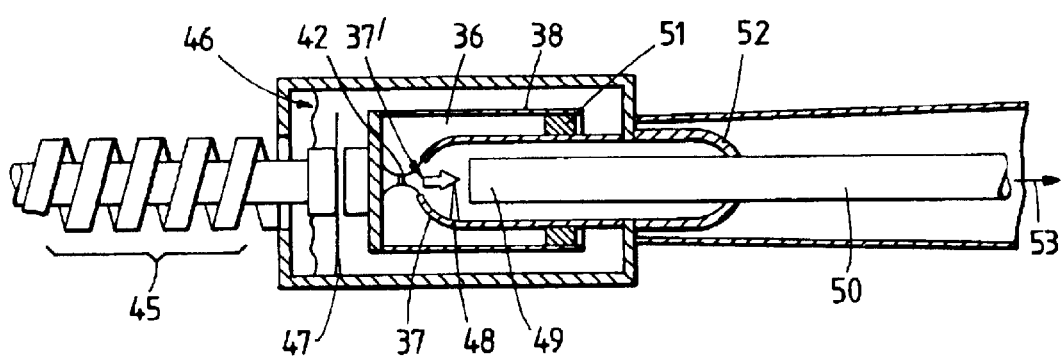
FIG. 7 is a schematic diagram of a plasma focus device for use in a system according to the present invention which may be used instead of the triode of FIG. 6.
Figure 8:
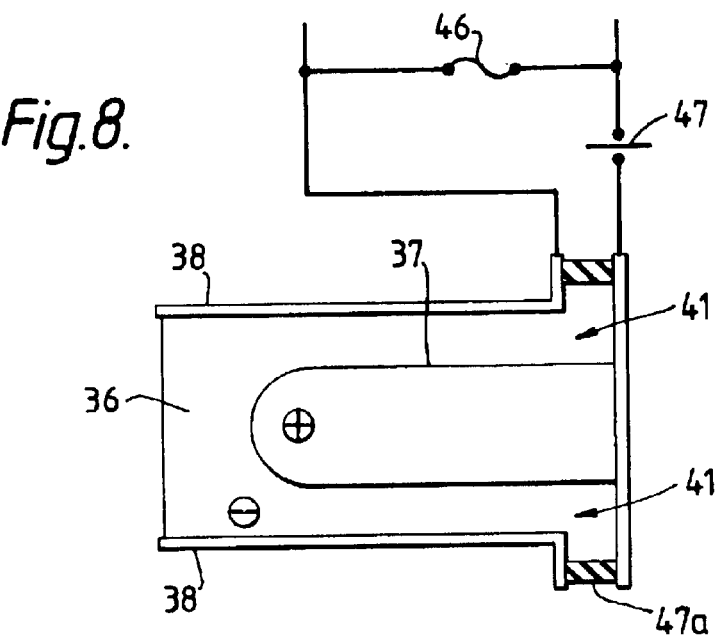
FIGS. 8 to 11 illustrate schematically a conventional plasma focus device.
Figure 9:
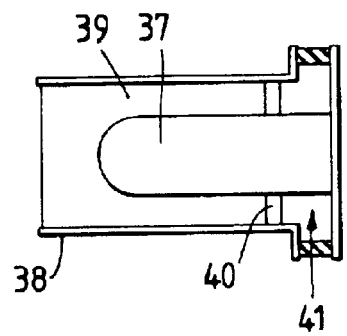
Figure 10:
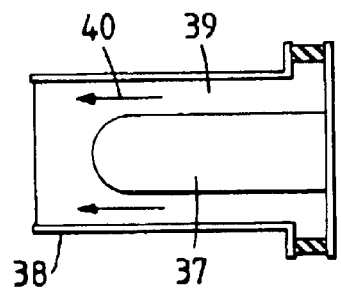
Figure 11:
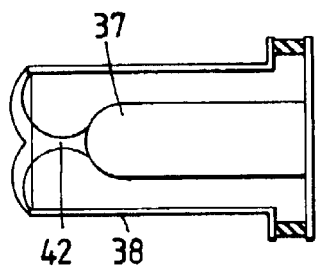

A microwave converter which operates on a plasma focus principle is illustrated in FIG. 7. A conventional plasma focus device will first be described with reference to FIGS. 8 to 11. The plasma focus cavity 36 is shown in more detail in FIG. 8, and is defined as the space between tan concentric electrodes 37, 38 and is filled with a low density hydrogen or deuterium gas. The central electrode 37 is the anode and the outer electrode 38, the cathode. A circuit comprising a fuse 46 and a dielectric switch 47 is shown in FIG. 8 and is for providing a high voltage pulse to the plasma focus device. An insulator 47a is provided electrically to separate the electrodes 37 and 38.

Figure 12:
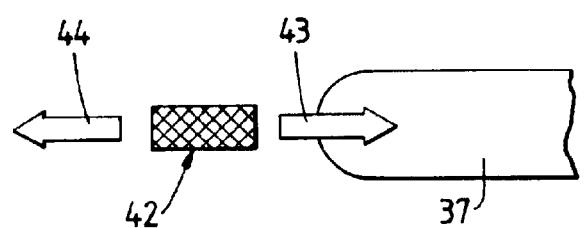
FIG. 12 illustrates the charge flow after a pinch discharge of a plasma focus.

When the circuit is made, a current sheet 40 is formed in the gas 39 near the input 41 (FIG. 9) and which travels rapidly along the electrodes 37, 38 accelerating the gas due to electromagnetic interaction until the arcuate end of the central electrode 37 is reached. At this point, a high intensity 'pinch' discharge 42 is formed which collapses to a diameter of approximately one millimetre, forcing a very high current to flow through a narrow current channel. During this time, the current decreases and the voltage increases due to the energy stored in the magnetic flux associated with the current sheet 40 being deposited into the pinch discharge 42. Also at this time, there is a sudden burst of hard X-rays and bremsstrahlung (which may be accompanied by neutrons if the gas 39 is deuterium). This burst lasts for about 100 ns and comprises two or more discrete pulses of radiation. The pinch discharge 42 generates two intense particle beams 43, 44 as shown in FIG. 12. One beam 43 is an electron beam which flows towards the central electrode or anode 37, and the other beam 44 is an ion beam which flows away from the discharge 42 in the opposite direction to the electron beam 43. The electron beam is of prime interest here as although it only lasts a few picoseconds, it is accompanied by intense radiation including radiation having a frequency of the order of tens of gigahertz.

Referring again to FIG. 7, the anode 37 has a focus aperture 37' through which the electron beam generated passes—this is described in more detail later. The electric energy generated by the explosive power generator 45 (equivalent to the flux compressor of FIG. 2) is switched to the plasma focus cavity 36 via a fuse 46 (equivalent to conductor 9 in FIG. 2) and a dielectric switch 47 (equivalent to dielectric switch 15 in FIG. 2) to provide the input current for activation of the plasma focus cavity 36. The output from the cavity, a beam 48 of relativistic electrons i.e. the electron beam 43 is applied to one end 49 of an antenna section 50 which penetrates the plasma focus cavity 36 after passing through the aperture 37. The two electrodes 37, 38 are isolated from each other by an insulating member 51. Similarly, the antenna section 50 is isolated from the central electrode 37 by an insulating member 52. The output from the antenna section 50 is a beam 53 of microwave radiation associated with the electron beam 43.

Figure 13:
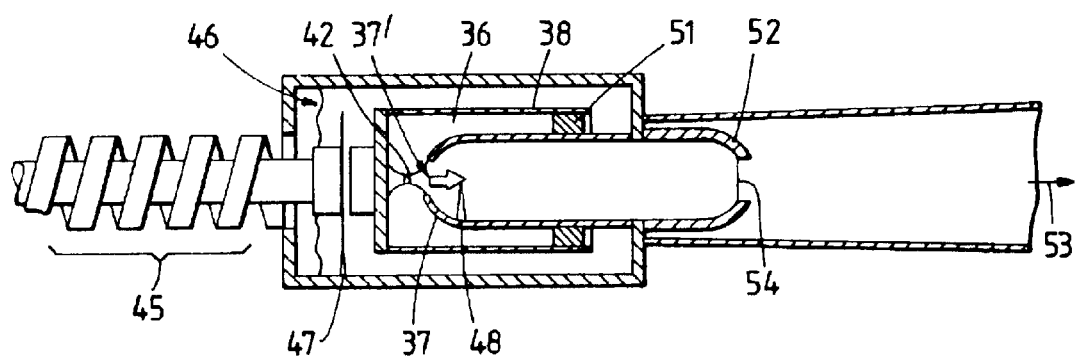
FIG. 13 is a schematic diagram of a plasma focus device similar to that of FIG. 7 but with a direct emission window instead of an antenna section.

FIG. 13 illustrates a further embodiment in which the antenna section 50 of FIG. 7 is replaced by a direct transmission window 54 the electron beam 43 being incident on the window to provide the output radiation beam 52. As the beam passes through the air, it is envisaged that brensstrahlung may be obtained due to the interaction of the ions with air molecules. This radiation would have an extremely broad waveband.

What is claimed is:

1. A weapon for affecting electronic equipment on board a remote target, the weapon comprising:
    an electromagnetic pulse source for producing an electromagnetic pulse having a power level of at least one Gigawatt;
    first switch means connected to the electromagnetic pulse generating means for interrupting the flow of the pulse and for causing the production of a high voltage pulse across the first switch means;

second switch means connected to the first switch means, for responding to the production of the high voltage pulse, to conduct electrical energy away from the first switch means;

second switch means connected to said electrically conductive means or responding to the production of the high voltage pulse to conduct an electrical energy pulse out of the electrically conductive means;

microwave energy conversion means connected to the second switch means for receiving the electrical energy and converting it to a pulse of microwave energy; and radiation means coupled to the microwave energy conversion means and operable for transmitting the microwave energy pulse as a directional radiation beam towards said target.

2. A weapon for affecting electronic equipment on board a remote target, the weaponing comprising:

an electromagnetic pulse source;

electrically conductive means, defining an electrical circuit, which is connected to said source and which is operable for conducting a current pulse from the electromagnetic pulse source around the circuit for generating magnetic flux in a space bounded by the circuit;

actuating means couple to said electrically conductive means and operable to cause the electrical circuit to collapse abruptly inwards for reducing the dimensions of said space, concentrating said magnetic flux and for increasing the current flowing in the circuit;

first switch means included in said electrical circuit for breaking the electrical circuit whilst said increased current is flowing therein and causing the production of a high voltage pulse within the electrically conductive means;

second switch means connected to said electrically conductive means for responding to the production of the high voltage pulse to conduct an electrical energy pulse out of the electrically conductive means;

microwave energy conversion means connected to the second switch means for receiving the electrical energy and converting it to a pulse of microwave energy; and radiation means coupled to the microwave energy conversion means and operable for transmitting the microwave energy pulse as a directional radiation beam towards said target.

3. A weapon according to claim 2, wherein said electrically conductive means comprises first and second elongate metal members each having one end connected to the current pulse source and arranged so as to diverge one from another towards the other ends of the members, said actuating means comprising explosive material adjacent said metal members for causing the metal members to collapse towards on another progressively from the one to the other end of each metal member, and said first switch means comprising a further elongate metal member joining said other ends of the first and second metal members and operable to melt and break the electrical circuit in response to the passage of said increased current therethrough.

4. A weapon according to claim 2, including a voltage set-up transformer connected between the second switch means and the conversion means.

5. A weapon according to claim 2, wherein the conversion means comprises a reflex triode device including a housing containing a cathode and a foil anode arranged for electrons from the cathode to pass and through the anode and thereafter to execute a progressively decaying oscillatory motion back and forth through the anode, said housing including window means for permitting exit of microwave radiation produced as a result of said decaying oscillatory motion of said electrons.

6. A weapon according to claim 2, wherein the conversion means comprises a plasma focus device including a cathode and an anode shaped and positioned for an electrical discharge to pass between them and for said discharge to move relative to the cathode and anode to positions thereon which enforce the discharge to become pinched and concentrated, said anode having an aperture therein for receiving the electron beams arising from the concentration of said discharge, and the device further including microwave transmission means coupled to said aperture for receiving microwave radiation associated with said electron beam.

7. A weapon according to claim 6, wherein the microwave transmission means includes a microwave transparent window.

8. A weapon according to claim 6, wherein the microwave transmission means includes a wave guide.

9. A weapon according to claim 2, wherein said radiating means comprises a microwave antenna system.

* * * * *